(12) United States Patent
Hanks et al.

(10) Patent No.: US 9,827,940 B2
(45) Date of Patent: Nov. 28, 2017

(54) SIDE AIRBAG WITH INTERNAL DIFFUSER

(71) Applicants: Scott Thead Hanks, Clinton, UT (US); Rui Liu, Shanghai (CN)

(72) Inventors: Scott Thead Hanks, Clinton, UT (US); Rui Liu, Shanghai (CN)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 15/071,579

(22) Filed: Mar. 16, 2016

(65) Prior Publication Data
US 2017/0267206 A1    Sep. 21, 2017

(51) Int. Cl.
| | |
|---|---|
| *B60R 21/207* | (2006.01) |
| *B60R 21/231* | (2011.01) |
| *B60R 21/261* | (2011.01) |
| *B60R 21/2346* | (2011.01) |
| *B60R 21/26* | (2011.01) |
| *B60R 21/217* | (2011.01) |

(52) U.S. Cl.
CPC ........ *B60R 21/2346* (2013.01); *B60R 21/207* (2013.01); *B60R 21/217* (2013.01); *B60R 21/231* (2013.01); *B60R 21/26* (2013.01); *B60R 21/261* (2013.01); *B60R 2021/2078* (2013.01); *B60R 2021/23146* (2013.01); *B60R 2021/23153* (2013.01); *B60R 2021/2612* (2013.01)

(58) Field of Classification Search
CPC . B60R 21/2346; B60R 21/261; B60R 21/207; B60R 21/21; B60R 21/23138; B60R 2021/2078; B60R 2021/23153; B60R 2021/2612; B60R 2021/23146
See application file for complete search history.

(56) References Cited

U.S. PATENT DOCUMENTS

| | | | |
|---|---|---|---|
| 6,561,539 B1 * | 5/2003 | Sunabashiri | ...... B60R 21/23138 280/729 |
| 7,131,664 B1 | 11/2006 | Pang et al. | |
| 7,347,444 B2 | 3/2008 | Wheelwright | |
| 7,448,645 B2 * | 11/2008 | Bederka | ................ B60R 21/207 280/730.2 |
| 7,625,008 B2 | 12/2009 | Pang et al. | |
| 7,770,921 B2 * | 8/2010 | Mueller | ................ B60R 21/207 280/730.2 |

(Continued)

FOREIGN PATENT DOCUMENTS

JP    WO 2015075984 A1 *    5/2015    ......... B60R 21/2346

*Primary Examiner* — Laura Freedman
(74) *Attorney, Agent, or Firm* — Pauley Erickson & Kottis

(57) ABSTRACT

Side airbags to provide protection to vehicle occupants are provided. The side airbags include an outer skin forming an inflatable chamber having an upper thorax portion and a lower pelvic portion for contact with the thorax region and the pelvic region, respectively, of the associated vehicle occupant. The side airbag includes a loop diffuser for placement about an inflator disposed within the inflatable chamber. The loop diffuser has opposed first and second open ends to permit communication of inflation gas to the upper thorax portion and to the lower pelvic portion, respectively, of the inflatable chamber. The loop diffuser permits significantly greater flow of inflation gas to the lower pelvic portion as compare to flow of inflation gas to the upper thorax portion of the inflatable chamber. The first open end can be significantly smaller in cross section as compared to the second open end.

19 Claims, 7 Drawing Sheets

(56) References Cited

U.S. PATENT DOCUMENTS

| | | | |
|---|---|---|---|
| 7,878,539 B2 | 2/2011 | Maripudi et al. | |
| 8,056,923 B2 * | 11/2011 | Shimono | B60R 21/207 280/729 |
| 8,356,835 B2 * | 1/2013 | Yamamoto | B60R 21/23138 280/729 |
| 8,419,060 B2 * | 4/2013 | Yamamoto | B60R 21/23138 112/475.08 |
| 8,714,585 B2 | 5/2014 | Okamoto et al. | |
| 9,056,591 B2 * | 6/2015 | Fujiwara | B60R 21/2346 |
| 2005/0062262 A1 | 3/2005 | Williams | |
| 2010/0276917 A1 | 11/2010 | Chavez et al. | |
| 2013/0069347 A1 | 3/2013 | Jenny et al. | |
| 2013/0113193 A1 | 5/2013 | Börjeson et al. | |
| 2013/0147168 A1 | 6/2013 | Alenspach et al. | |
| 2014/0246844 A1 | 9/2014 | Richards et al. | |
| 2015/0048602 A1 | 2/2015 | Gwon et al. | |
| 2015/0115583 A1 * | 4/2015 | Azuma | B60R 21/231 280/740 |
| 2015/0343985 A1 * | 12/2015 | Sugimoto | B60R 21/23138 280/730.2 |
| 2016/0101758 A1 * | 4/2016 | Fujiwara | B60R 21/23138 280/729 |
| 2016/0101759 A1 * | 4/2016 | Fujiwara | B60R 21/261 280/730.2 |
| 2016/0264091 A1 * | 9/2016 | Fujiwara | B60R 21/2346 |

\* cited by examiner

SIDE AIRBAG WITH INTERNAL DIFFUSER

BACKGROUND OF THE INVENTION

Field of the Invention

This invention relates generally to airbags such as used to provide impact protection for an occupant of a motor vehicle and, more particularly, to side airbags including or having an internal diffuser such as particularly suited in or for the protection of a seated vehicle occupant in the event of the occurrence of a side impact or collision.

Discussion of Related Art

Vehicular inflatable restraint systems, e.g., airbag systems, were developed to supplement conventional safety belts by deploying into the space between an occupant and an interior object or surface in the vehicle during a collision event. The airbag acts to decelerate the occupant, thus reducing the possibility of injury to the occupant caused by unintended contact with the interior of the vehicle.

Many typical airbag systems consist of several individual components joined to form an operational module. Such components generally include an airbag, an inflator, a sensor, and an electronic control unit. Airbags are typically constructed or made of a thin, durable fabric or other material that is folded to fit into a compartment of a steering wheel, dashboard, vehicle seat, compartment, roof, roof rail, or other space in or of a vehicle. The airbag inflator is in fluid communication with the airbag cushion, and is configured to supply or produce a gas to inflate the airbag when it is needed. The sensors detect sudden decelerations of the vehicle that are characteristic of an impact. The readings taken by the sensors are processed in the electronic control unit using an algorithm to determine whether a collision has occurred.

Upon detection of an impact of sufficient severity, the control unit sends an electrical signal to the inflator. The inflator using one or more of various technologies, including pyrotechnic compounds and stored pressurized gas, produces, forms or otherwise supplies or provides a volume of an inflation gas. The inflation gas is channeled into the airbag, to inflate the airbag. Inflation of the airbag causes it to deploy, placing it in position to receive the impact of a vehicle occupant. After inflation, the airbag rapidly deflates such as by venting the inflation gas from an opening or openings in the airbag and thus facilitating the occupant to exit the vehicle.

As experience in the manufacture and use of airbags has increased, the engineering challenges involved in their design, construction, and use have become better understood. Inflatable restraint systems typically include devices to protect an occupant in a vehicle by absorbing physical impact resulting upon a vehicle collision using the elasticity of an airbag cushion. Airbag systems can generally be classified into systems such as a driver airbag system, a passenger airbag system, and a side airbag system.

The use of side airbags, also sometimes referred to as side impact airbags, is widespread in present day automotive technology. Typically, a side airbag is stored or located in an inner side structure, such as a pillar of a vehicle or in a backrest of a seat of a vehicle and, in the event of an impact or collision helps to protect an occupant, especially the thorax of an occupant, during a side impact or collision.

In practice, side airbag systems are generally installed to prevent or otherwise minimize or reduce harm to an occupant resulting from colliding with the vehicle side or door as well as to prevent an occupant from being injured by fragments of a broken door window or to prevent an occupant from being expelled from a vehicle body such as, for example, when the occupant is inclined to the door or the door is dented inward upon the side collision of the vehicle.

As will be appreciated, as compared to frontal impacts and frontal airbags, side impacts or collisions such as to cause or produce the deployment of a side airbag typically result in a significantly reduced time period between the occurrence of deployment event, e.g., the vehicle collision or impact, and contact of the occupant with the deployed airbag.

Placement and positioning of the airbags are typically determined based on presumptions made of the position of a vehicle occupant during normal operation of the vehicle. Thus, a vehicle occupant enjoys optimal protection from a specific airbag when the occupant is in the presumed range of positions when the airbag deploys.

In some situations, injuries have been noted to occur when the occupant is "out-of-position" (OOP) with regard to the presumed position discussed above. Further, due to the close positioning to occupants of side airbags and the reduced time period between the occurrence of deployment event and contact of the occupant with a side airbag, the problems of out-of-position occupants can be particularly troublesome in connection with side airbags.

While increasing the volume of the airbag or decreasing the inflator generate load can act to decrease the airbag forces experienced by an OOP occupant, such approaches are generally contrary to the sought objective of providing desired occupant protection in the event of a vehicle impact.

It has been discovered that various parts of the body require different levels of impact protection. For example, a seat mounted side airbag may inflate beside an occupant in a vehicle seat to protect the pelvis and thorax of the occupant against lateral impact. The weight of the occupant may generally tend to slide with the pelvis; hence, it may be beneficial for the pelvic portion of the seat mounted airbag to inflate stiffly to provide comparatively firm protection. By contrast, the thorax is more sensitive and generally carries less mass, and thus should preferably be more softly cushioned during impact to avoid potential injury to an occupant's ribs.

Recently, dual chambered side impact airbags have been developed to provide a pressure differential between the pelvic and thorax portions of a side airbag. These airbags have two separate chambers, one on top of the other. The top chamber is used for providing impact protection for the thorax of an occupant in a seat and the bottom chamber is used to provide impact protection for an occupant's pelvis. In these systems an inflator is placed in a housing that has multiple orifices for channeling inflation gases into both chambers. The pelvic chamber is inflated to a higher pressure than that of the thorax chamber.

As with other types of airbags, thorax/pelvic side airbags must be deployed rapidly in order to be effective. When a vehicle or some other object impacts the side of another vehicle, the side airbag must deploy in a matter of milliseconds. However, the airbag industry has experienced difficulty in deploying the lower pelvic portion of the side airbag in its intended position in a sufficient time period. This is because intrusion into the vehicle compartment generally occurs at or near the pelvic region due to the location of the colliding vehicle's bumper. If the pelvic portion of the side airbag is not positioned before significant intrusion occurs, the deploying side airbag may rebound off the armrest on the vehicle door, or otherwise be prevented from deploying in its proper position, possibly compromising the physical safety of the occupant.

Accordingly, it is desirable to develop a side airbag system that can rapidly and timely position the pelvic portion of the inflatable cushion in its intended position to provide effective impact protection for a passenger. It is further desirable to have an airbag assembly capable of having at least two inflatable portions that are inflated to different pressures while simultaneously maintaining its ability to position itself in a rapid and timely manner. It is also desirable to provide a side impact airbag cushion that is firm enough to prevent strikethrough of the occupant's pelvis while simultaneously being soft enough to provide adequate impact protection while limiting the possibility of being injured by the bag itself.

Thus, with the widespread usage and incorporation of side airbag cushions, there is a growing need and demand for improved side airbag cushion designs and manufacture such as can desirably achieve improved control of inflation gas flow and/or improved control of airbag deployment.

SUMMARY OF THE INVENTION

A general object of the invention is to provide improved airbags such as used to provide impact protection for an occupant of a motor vehicle.

A more specific objective of the invention is to overcome one or more of the problems or shortcomings described above.

A more specific object of at least certain aspects of the invention is to provide an improved side airbag including or having an internal diffuser such as particularly suited in or for the protection of a seated vehicle occupant in the event of the occurrence of a side impact or collision.

In accordance with one aspect of the invention a side airbag for installation in a motor vehicle to provide protection to an associated vehicle occupant is provided.

In one embodiment, a side airbag is provided that includes an outer skin forming an inflatable chamber having an upper thorax portion adapted for contact with a thorax region of the associated vehicle occupant and a lower pelvic portion adapted for contact with a pelvic region of the associated vehicle occupant. The side airbag includes a loop diffuser adapted for placement about an inflator disposed at least in part within the inflatable chamber. The loop diffuser has opposed first and second open ends, wherein the first open end is adapted to permit communication of inflation gas from the inflator to the upper thorax portion of the inflatable chamber and the second open end is adapted to permit communication of inflation gas from the inflator to the lower pelvic portion of the inflatable chamber. In accordance with a preferred practice, the loop diffuser first open end is significantly smaller in cross section as compared to the loop diffuser second open end.

In one embodiment, a rear side airbag for installation in a motor vehicle to provide protection to an associated vehicle occupant is provided. The rear side airbag includes an outer skin forming a single inflatable chamber. The single inflatable chamber has, forms or includes an upper thorax portion adapted for contact with a thorax region of the associated vehicle occupant and a lower pelvic portion adapted for contact with a pelvic region of the associated vehicle occupant. The rear side airbag includes a loop diffuser adapted for placement about an inflator disposed at least in part within the inflatable chamber. The loop diffuser has a truncated triangular outline in a flattened condition and a truncated cone shape during inflation of the inflatable chamber. The loop diffuser further includes opposed first and second open ends. The first open end of the loop diffuser is adapted to permit communication of inflation gas from the inflator to the upper thorax portion of the inflatable chamber. The second open end of the loop diffuser is adapted to permit communication of inflation gas from the inflator to the lower pelvic portion of the inflatable chamber. The loop diffuser is further adapted to permit significantly greater flow of inflation gas from the inflator to the lower pelvic portion of the inflatable chamber as compare to flow of inflation gas from the inflator to the upper thorax portion of the inflatable chamber.

In accordance with another aspect of the invention, there is provided a rear side airbag assembly for installation in a motor vehicle to provide protection to an associated vehicle occupant. In one embodiment, the rear side airbag assembly includes a rear side airbag having an outer skin forming a single inflatable chamber. The inflatable chamber has or includes an upper thorax portion adapted for contact with a thorax region of the associated vehicle occupant and a lower pelvic portion adapted for contact with a pelvic region of the associated vehicle occupant. The assembly includes an inflator device disposed at least in part within the rear side airbag. The inflator device is adapted, upon actuation, to supply a quantity of inflation gas to the rear side airbag to inflate the inflatable chamber. The assembly also includes a loop diffuser disposed at least in part within the inflatable chamber about the inflator device. The loop diffuser has opposed first and second open ends, wherein the first open end is adapted to permit communication of inflation gas from the inflator device to the upper thorax portion of the inflatable chamber and the second open end is adapted to permit communication of inflation gas from the inflator device to the lower pelvic portion of the inflatable chamber. The loop diffuser is adapted to permit significantly greater flow of inflation gas from the inflator device to the lower pelvic portion of the inflatable chamber as compare to flow of inflation gas from the inflator device to the upper thorax portion of the inflatable chamber.

As used herein, references to "significantly smaller" when referencing or comparing one diffuser end opening relative to another are to be understood as generally referring to the smaller of the comparative items in alternative embodiments being 50% smaller, 25% smaller and 10% smaller.

Correspondingly, references herein to "significantly greater flow" when referring or comparing two inflation gas flows are to be understood as generally referring to the greater of the comparative items in alternative embodiments being 100% greater, 400% greater and 1000% greater.

Other objects and advantages will be apparent to those skilled in the art from the following detailed description taken in conjunction with the appended claims and drawings.

BRIEF DESCRIPTION OF THE DRAWINGS

Various embodiments will hereinafter be described in conjunction with the following drawing figures wherein like numerals generally denote like elements, and wherein.

DETAILED DESCRIPTION OF THE INVENTION

The present invention provides a new and improved side airbag and side airbag assembly.

Figure 1:
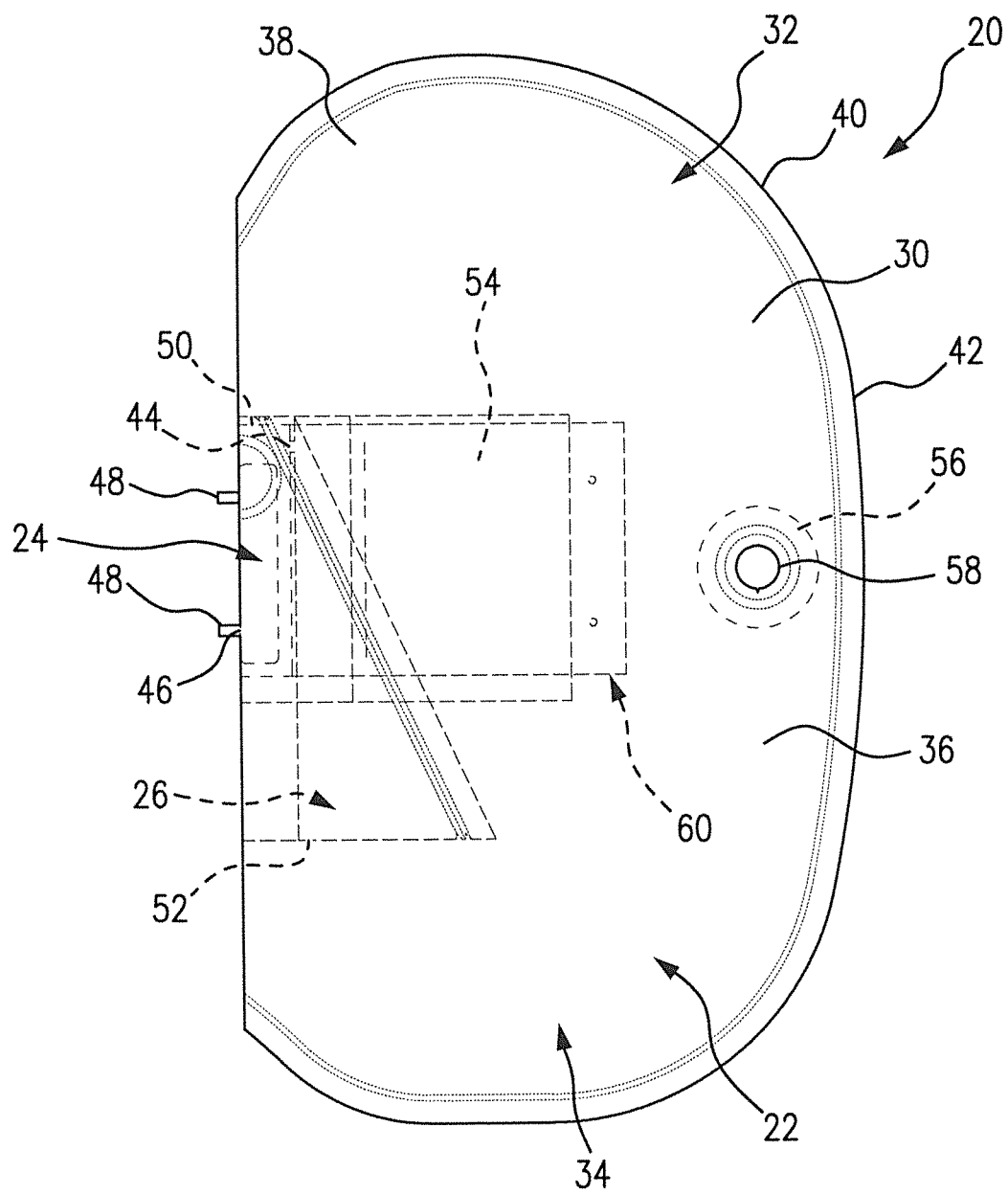
FIG. 1 is a side view showing a rear side airbag assembly in accordance with one embodiment of the invention.

Turning first to FIG. 1, there is generally shown a rear side airbag assembly, generally designated by the reference numeral 20, and in accordance with a one embodiment of the invention. While the invention will be described hereinafter with particular reference to a rear side airbag cushion and associated airbag inflatable restraint system installations such as for use in motor vehicles, those skilled in the art and guided by the teachings herein provided will understand and appreciate that the broader practice of the invention is not necessarily so limited as the invention can have general applicability to other types or kinds of side airbag assemblies including, for example, front side airbags such as for a vehicle occupant seat in a front seat of a vehicle, such a side airbag commonly stowed in the side of the seatback parallel with the B pillar of the vehicle, where such vehicles are commonly automotive or motor vehicles including vans, pick-up trucks, and particularly automobiles.

As described in greater detail below, rear side airbag assembly 20 generally includes a rear side airbag 22, an inflator device 24 disposed at least in part within the rear side airbag 22, and a loop diffuser 26 disposed at least in part about the inflator device 24 within the rear side airbag 22 and, more particularly, at least in part within the inflatable chamber of the airbag.

For ease of discussion and understanding, the rear side airbag assembly 20 is shown in FIG. 1 in a generally flattened or planar form. As will be appreciated by those skilled in the art and guided by the teachings herein provided, such an airbag assembly can be appropriately packaged such as by folding and/or wrapping the airbag to form an assembly suited for appropriate transport for manufacture and subsequent installation in a selected location (e.g., a seat back) within a motor vehicle.

The rear side airbag 22 has or includes an outer skin 30 forming a single inflatable chamber having an upper thorax portion 32 adapted for contact with a thorax region of the associated vehicle occupant and a, generally adjacent, lower pelvic portion 34 adapted for contact with a pelvic region of the associated vehicle occupant.

Figure 3:
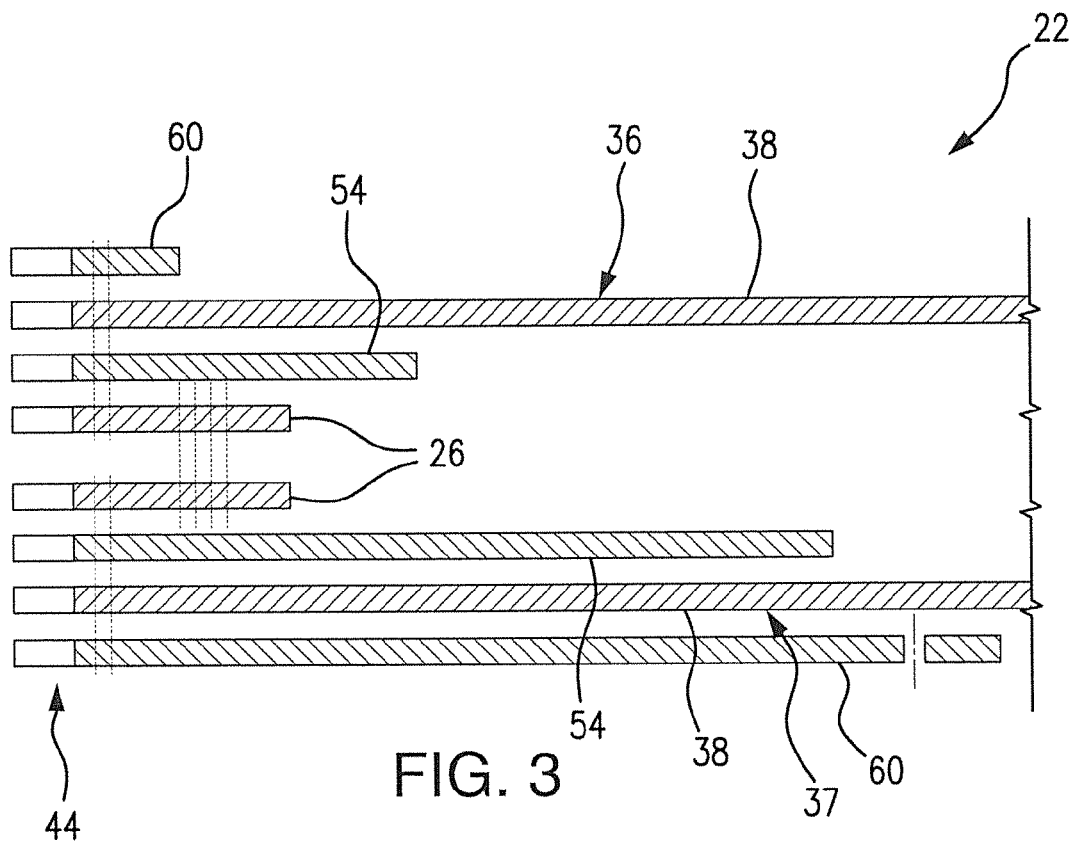
FIG. 3 is a sectional view along the line 3-3 shown in FIG. 2.
Figure 4:
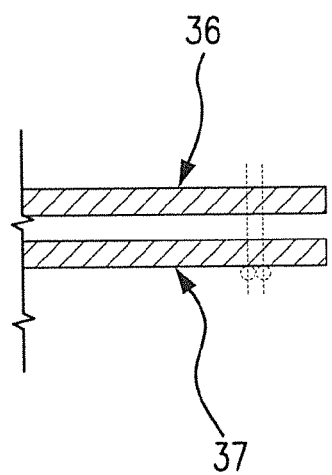
FIG. 4 is a sectional view along the line 4-4 shown in FIG. 2.

FIG. 1 depicts the rear side impact airbag 22 of the present invention from a side plan view of an inboard side 36 of the airbag 22. The inboard side 36 is the side of the airbag 22 that faces toward the inside of a vehicle. Side impact airbags 22 typically deploy from a position in a vehicle seat (not shown) adjacent the seat's occupant, such that the airbag 22 is positioned between the occupant and a side structure of the vehicle. The side of the airbag 22 that would be contacted by an occupant in a lateral-collision impact situation is the inboard side 36 of the airbag 22. The outboard side 37 of the airbag 22 is shown in FIGS. 3 and 4, described below.

The side impact airbag 22 is generally constructed of a main fabric panel 38 folded and sewn together by stitching 40 located on or about a peripheral edge 42 of the airbag 22.

The main fabric panel 38 forms or includes an opening 44 which serves to receive the inflator device 24. The main fabric panel 38 may also form or include one or more supplemental mounting stud holes 46 such as together with the opening 44 may appropriately correspond to mounting studs 48 such as located on the inflator device or its housing.

The inflator device 24 is generally adapted, upon actuation, to generate, produce or otherwise appropriately supply or provide a quantity of inflation gas to the rear side airbag 22 to inflate the inflatable chamber thereof. Inflator devices of various construction, design and/or operation are known in the art and the general practice of the invention is not necessarily limited by or to operation with specific or particular inflator devices.

The loop diffuser 26 is disposed at least in part within the inflatable chamber of the rear side airbag 22 about the inflator device 24. The loop diffuser 26 has or includes opposed first and second open ends, 50 and 52. As shown, the first open end 50 is adapted to permit communication of inflation gas from the inflator device 24 to the upper thorax portion 32 of the side airbag inflatable chamber and the second open end 52 is adapted to permit communication of inflation gas from the inflator device 24 to the lower pelvic portion 34 of the side airbag inflatable chamber. As described in greater detail below, the loop diffuser 26 is adapted to permit significantly greater flow of inflation gas from the inflator device 24 to the lower pelvic portion 34 of the side airbag inflatable chamber as compare to flow of inflation gas from the inflator device 24 to the upper thorax portion 32 of the side airbag inflatable chamber.

The rear side airbag assembly 20 may, as shown, further include a heat shield 54, such as appropriately disposed adjacent or in the vicinity of the inflator device 24, a vent patch 56, such as appropriately placed adjacent or in the vicinity of vent hole 58 permitting desired release of inflation gas from within the side airbag inflatable chamber, and a wrapper 60.

FIGS. 2-11 show components or subassemblies of rear side airbag assemblies in accordance with certain preferred embodiments, particularly, the rear side airbag 22, the loop diffuser 26 and features thereof in greater detail.

Figure 2:
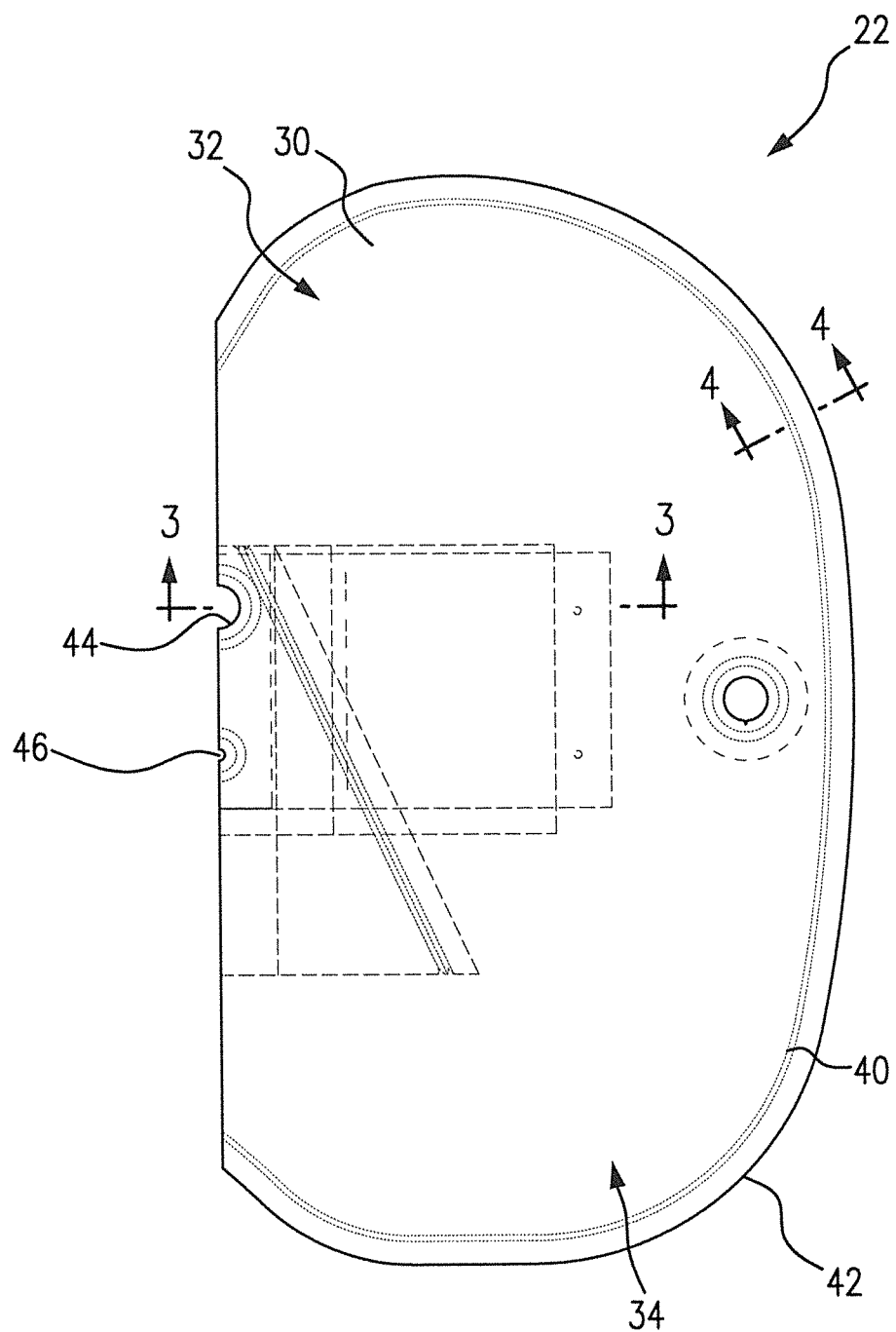
FIG. 2 is a side view showing a side airbag in accordance with one embodiment of the invention.
Figure 5:
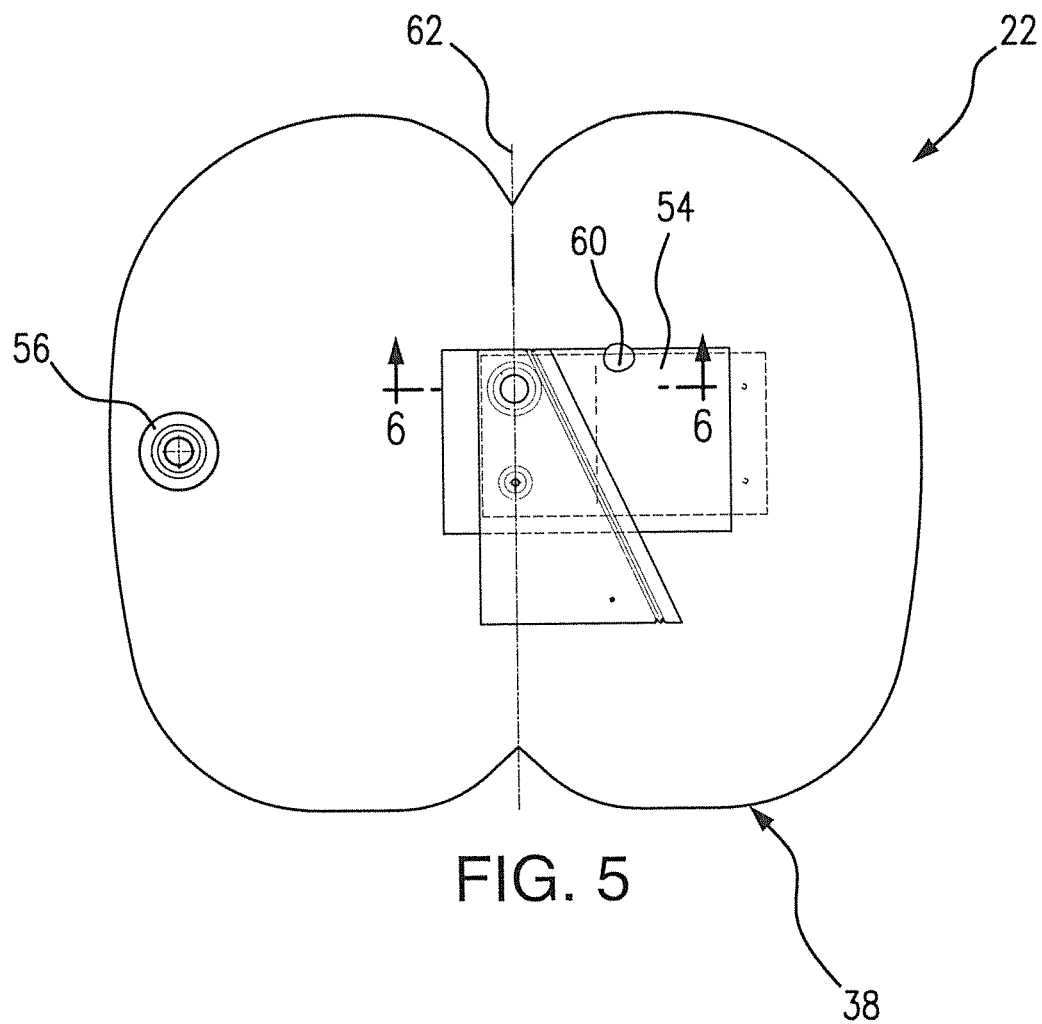
FIG. 5 is a plan view of a laid-out main panel subassembly of a rear side airbag in accordance with one embodiment of the invention.
Figure 6:
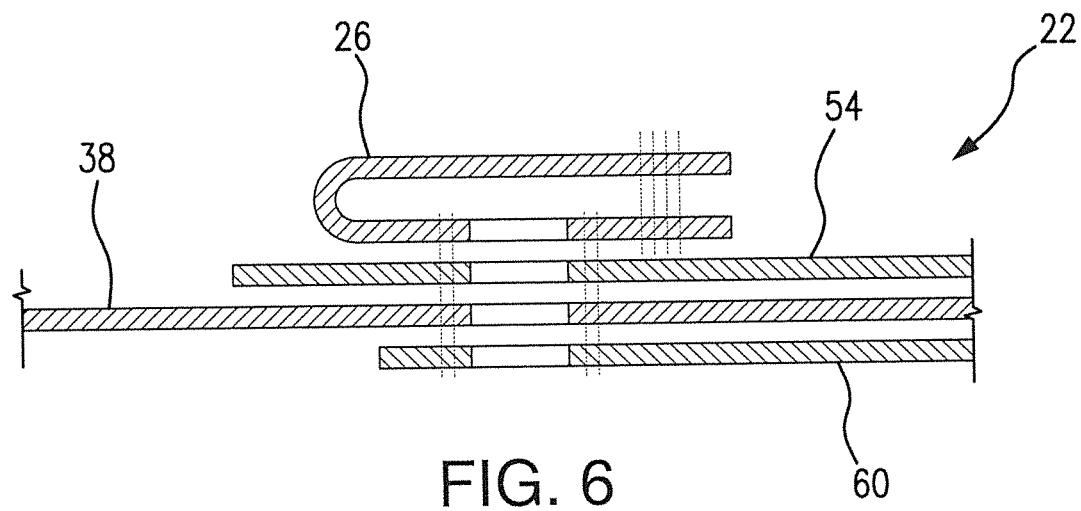
FIG. 6 is a sectional view along the line 6-6 shown in FIG. 5.
Figure 7:
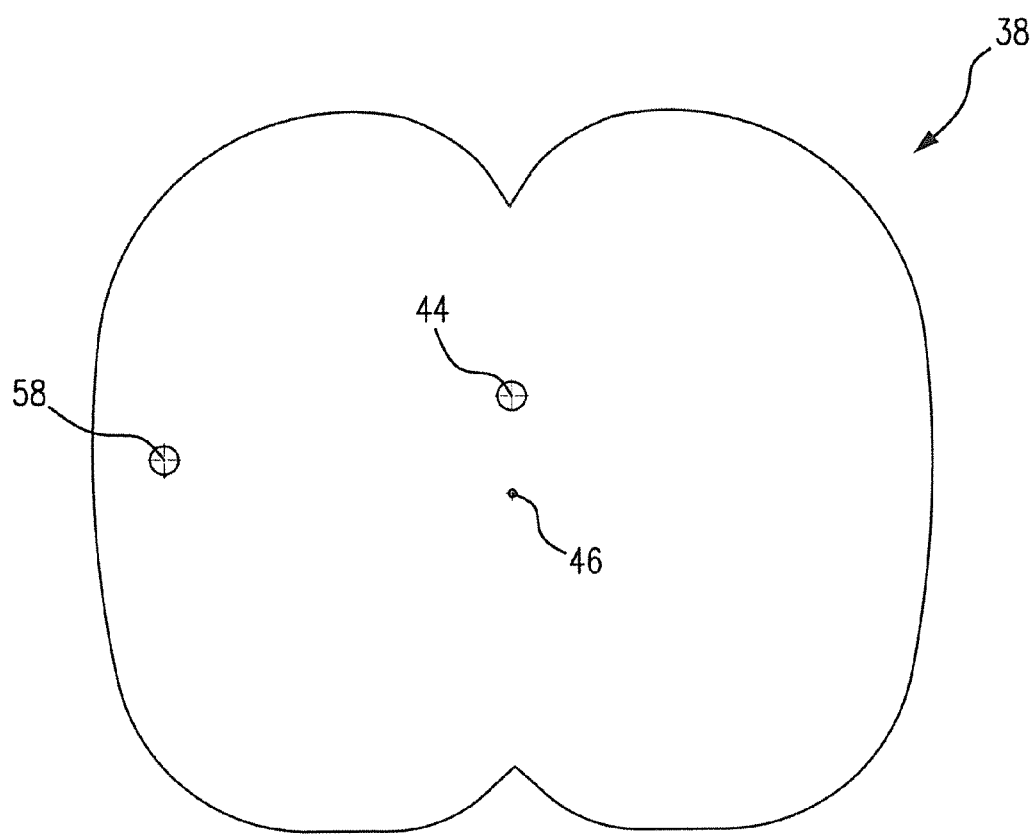
FIG. 7 is a plan view of the laid-out main panel of the airbag shown in FIG. 2.

More particularly, FIG. 2-4 show the side airbag assembly but now without showing the inflator device, FIGS. 5 and 6 show a main panel subassembly of an airbag similar to that shown in FIGS. 2-4, and FIGS. 7-11 show particular individual components: the main panel, the loop diffuser, the heat shield, the heat patch and the wrapper, respectively in laid-out form.

More specifically, these figures show the side impact airbag 22 having or forming the outer skin 30 that forms a single inflatable chamber having the upper thorax portion 32 adapted for contact with a thorax region of the associated vehicle occupant and the lower pelvic portion 34 adapted for contact with a pelvic region of the associated vehicle occupant. The main fabric panel 38 that at least in part forms the outer skin 30, is folded, such as along the fold line 62 shown in FIG. 5, and sewn together by stitching 40 located on or about the peripheral edge 42 of the airbag 22. The main fabric panel 38 has or includes the opening 44 such as may serve to receive the inflator device, one or more supplemental mounting stud holes 46 such as together with the opening 44 may appropriately correspond to mounting studs located on the inflator device or its housing.

The loop diffuser 26, such as disposed at least in part within the inflatable chamber of the rear side airbag 22, includes opposed first and second open ends, 50 and 52 wherein the first open end 50 is adapted to permit communication of inflation gas from the inflator device to the upper thorax portion 32 of the side airbag inflatable chamber and the second open end 52 is adapted to permit communication of inflation gas from the inflator device to the lower pelvic portion 34 of the side airbag inflatable chamber.

As shown in the illustrated embodiment, the loop diffuser 26 has or is generally triangularly shaped when in the flat condition. More specifically, such a loop diffuser has a generally truncated triangular outline in a flattened condition As will be appreciated, when inflated, such a shaped or formed loop diffuser will take or assume a shape generally corresponding to that of a cone. More specifically, such a loop diffuser will take or assume the general shape of a truncated cone shape during inflation of the inflatable chamber.

A loop diffuser, in accordance with one aspect of the invention, is adapted to permit significantly greater flow of inflation gas from the inflator to the lower pelvic portion of the inflatable chamber as compare to flow of inflation gas from the inflator to the upper thorax portion of the inflatable chamber.

A loop diffuser, in accordance with another aspect of the invention, has or includes a diffuser first open end that is significantly smaller in cross section as compared to the diffuser second open end.

Thus, the diffusers of the invention are useful in directing more of or a greater proportion of the inflation gas produced or supplied by the associated inflator device downward into the lower pelvic portion 34 of the side airbag inflatable chamber and less or a reduced proportion to the upper thorax portion 32 of the side airbag inflatable chamber.

As the human body can absorb different magnitudes of force at specific locations and as the pelvic region of the human body can generally withstand greater loads as compared to the thorax region of the human body, the employment of such loop diffusers as well as the employment of airbags and airbag assemblies incorporating such features can significantly and dramatically reduce the possible harms that may result from or be associated with Out-Of-Position (OOP) forces.

As shown, the loop diffuser 26 may further include an opening 63 such as to correspond and align with the opening 44 in the main fabric panel 38.

As identified above, the side airbag further includes the heat shield 54. As shown, the heat shield 54 may, as may be desired, include an opening 64 such as to correspond and align with the opening 44 in the main fabric panel 38. While the invention has been shown and described making reference to a construction with a single layer of heat shield material, those skilled in the art and guided by the teachings herein provided will understand and appreciate that constructions employing two or more or other multiple layers of heat shield material are specifically and expressly herein encompassed.

As identified above, the side airbag further includes the vent patch 56, such as appropriately placed adjacent or in the vicinity of a vent hole 58 permitting desired release of inflation gas from within the side airbag inflatable chamber. To that end, the vent patch may as shown include or have an opening 66 such as to correspond to the vent hole 58.

As will be appreciated the number, size, placement and form of the vent hole or holes can desirably be appropriately tailored for side airbags in particular vehicular applications.

As identified above, the side airbag further includes the wrapper 60. The wrapper, such as known in the art, can desirably serve and function to hold or otherwise appropriately maintain the side airbag in a folded, rolled or other desired form until the side airbag can be appropriately installed or assembled into its stowed vehicle location such as into a vehicle seat back, for example. Wrappers can suitably be made of woven or non-woven materials including, for example, PET (polyester) and PP (polypropylene).

As will be appreciated by those skilled in the art and guided by the teachings herein provided, the loop diffuser can be variously disposed, placed or otherwise positioned on or with the cushion or cushion panel in various locations such as depending on the performance needs for a specific or particular vehicle.

Further, relative to the associated cushion panel, the diffuser may be centered or, such as shown and perhaps best seen by reference to FIGS. 5 and 8, the diffuser may be offset relative to one side or the other and/or offset above or below the cushion panel center line, with the specific placement of the diffuser relative to the associated cushion panel dependent on a variety of possible factors including but not necessarily limited to cushion geometry, cushion fill time requirements as determined by the customer and airbag mounting location with respect to the vehicle seat back geometry.

Figure 12:
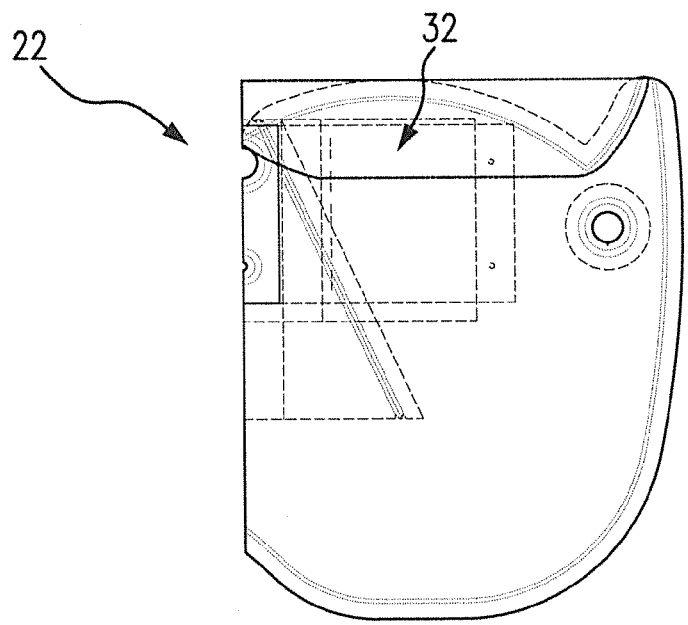
FIG. 12 is a plan view showing airbag of FIG. 2 at an intermediate point in the folding and assembly process.
Figure 14:
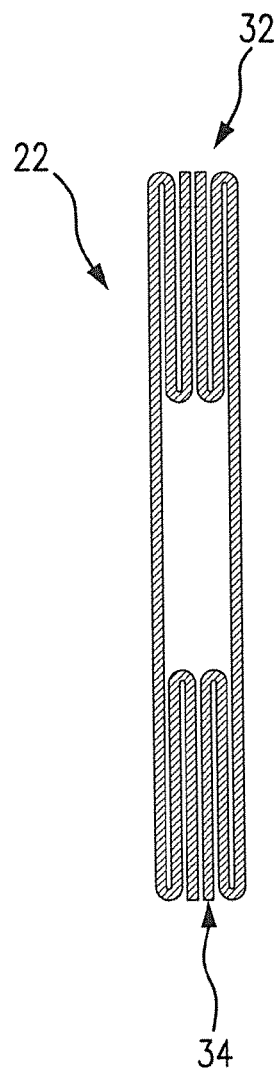
FIG. 14 is a simplified sectional view along the line 14-14 shown in FIG. 13.
Figure 13:
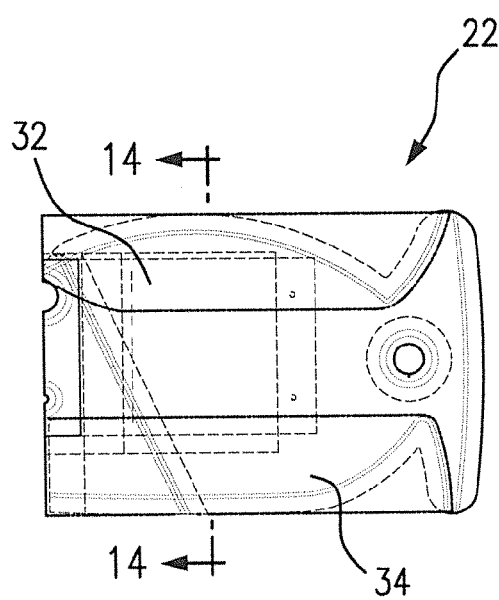
FIG. 13 is a plan view showing the airbag of FIG. 12 in a subsequent point in the folding and assembly process.

FIGS. 12-14 show the airbag 22 during the folding and assembly process. More particularly, FIG. 12 shows the airbag 22 after the top portion 32 of the airbag cushion has been tucked in, as shown. FIG. 13 shows the airbag 22 subsequently after the bottom portion 34 of the airbag cushion has been tucked in, as shown. FIG. 14 is a sectional view of the airbag cushion 22 shown in FIG. 13 but, for improved clarity, simplified by not showing the heat shield or the wrapper.

While the invention has been shown and described making reference to an airbag having an outer skin primarily formed by a single main fabric panel, the broader practice of the invention is not necessarily so limited as, for example, airbags having outer skins formed by two, three, four or other multiple number of panels may be employed for particular or specific applications.

Further, while the invention has been shown and described making specific reference to an airbag and an airbag outer skin that forms a single inflatable chamber such as includes or forms an upper thorax portion adapted for contact with a thorax region of the associated vehicle occupant and a lower pelvic portion adapted for contact with a pelvic region of the associated vehicle occupant, those skilled in the art and guided by the teaching herein provided will understand and appreciate that the broader practice of the invention is not necessarily so limited. For example, if desired, the invention can be practiced with an airbag or an airbag outer skin that forms two or more inflatable chambers or, alternatively, with two or more distinct airbags.

The present invention is described in further detail in connection with the following examples which illustrate or simulate various aspects involved in the practice of the invention. It is to be understood that all changes that come within the spirit of the invention are desired to be protected and thus the invention is not to be construed as limited by these examples.

EXAMPLES

Figure 8:
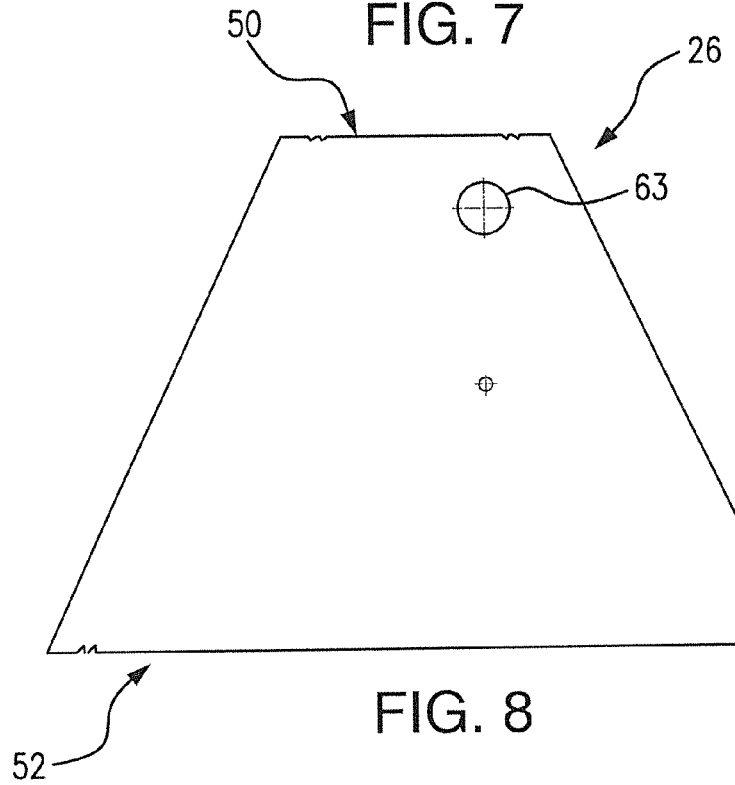
FIG. 8 is a plan view of the laid-out loop diffuser of the airbag shown in FIG. 2.
Figure 9:
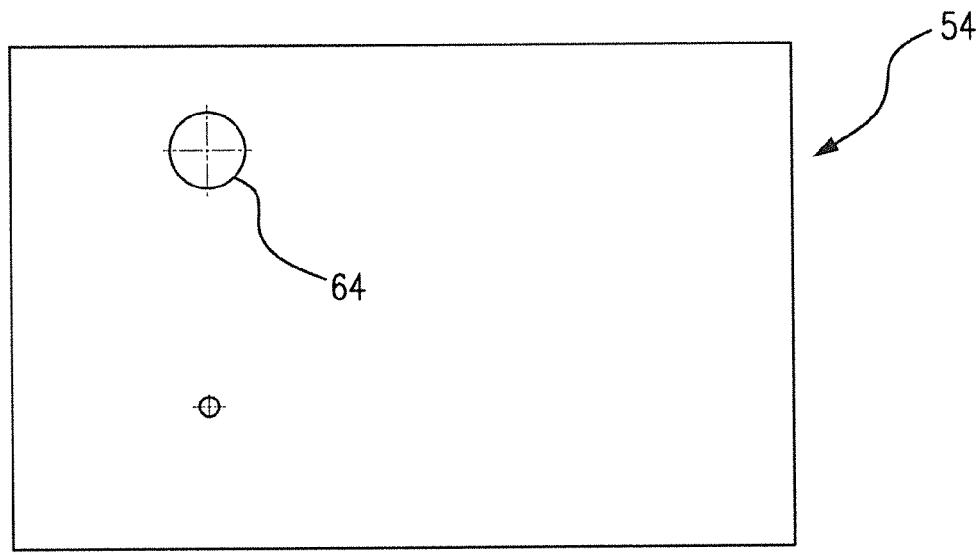
FIG. 9 is a plan view of the laid-out heat shield of the airbag shown in FIG. 2.
Figure 10:
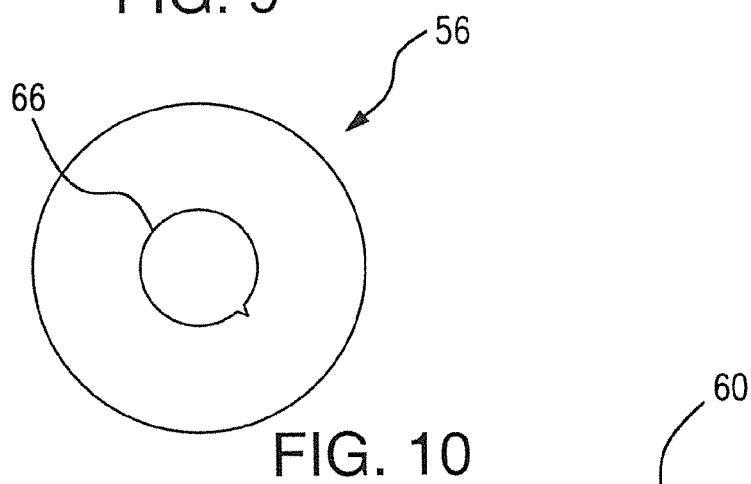
FIG. 10 is a plan view of the laid-out heat patch of the airbag shown in FIG. 2.
Figure 11:
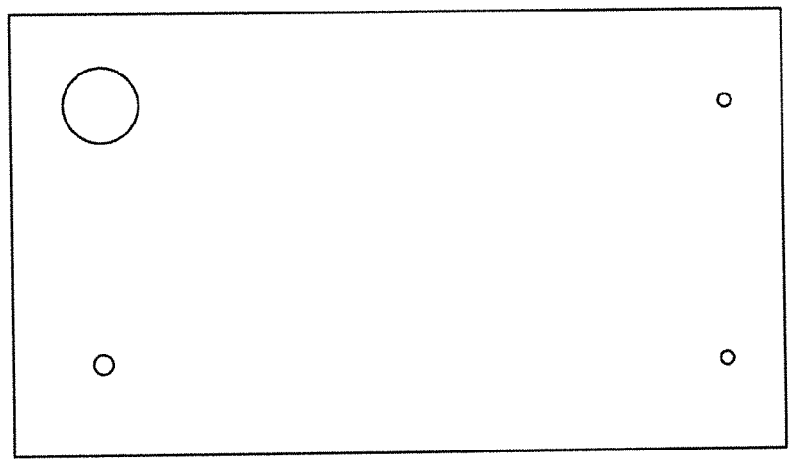
FIG. 11 is a plan view of the laid-out wrapper of the airbag shown in FIG. 2.

In this example, a truncated triangular loop diffuser such as shown in FIG. 8 was constructed. The diffuser had the dimensions listed below in TABLE 1, assuming that the opposed open ends of the diffuser take a circular shape upon deployment and inflation.

|  | Lay Flat Length (mm) | Circumference (mm) | Area (mm$^2$) |
| --- | --- | --- | --- |
| Top opening | 42 | 84 | 561 |
| Bottom opening | 145 | 290 | 6692 |

In this example, the area of the top open end of the diffuser was 8.4% of the area of the bottom open end of the diffuser.

Thus, the invention provides new and improved side airbags and side airbag assemblies such as provide desired occupant protection while desirably reducing or minimizing the possible consequences of an OOP occupant.

In accordance with one aspect, the invention provides new and improved rear side airbags and rear side airbag assemblies such as provide desired occupant protection while desirably reducing or minimizing the possible consequences of an OOP occupant.

The invention illustratively disclosed herein suitably may be practiced in the absence of any element, part, step, component, or ingredient which is not specifically disclosed herein.

The claims are not intended to include, and should not be interpreted to include, means-plus- or step-plus-function limitations, unless such a limitation is explicitly recited in a given claim using the phrase(s) "means for" or "step for," respectively.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A side airbag for installation in a motor vehicle and configured to provide protection to an associated vehicle occupant, the side airbag comprising:
    an outer skin forming an inflatable chamber having an upper thorax portion adapted for contact with a thorax region of the associated vehicle occupant and a lower pelvic portion adapted for contact with a pelvic region of the associated vehicle occupant, wherein the outer skin forms a single inflatable chamber including both the thorax portion and the pelvic portion, and
    a loop diffuser adapted for placement about an inflator disposed at least in part within the inflatable chamber, the loop diffuser having opposed first and second open ends, wherein the first open end is adapted to permit communication of inflation gas from the inflator to the upper thorax portion of the inflatable chamber and the second open end is adapted to permit communication of inflation gas from the inflator to the lower pelvic portion of the inflatable chamber, wherein the first open end is significantly smaller in cross section as compared to the second open end.

2. The side airbag of claim 1 wherein the side airbag is adapted for placement in a rear seat of the motor vehicle.

3. The side airbag of claim 1 wherein the side airbag is adapted for placement in a front seat of the motor vehicle.

4. The side airbag of claim 1 wherein the loop diffuser has a truncated triangular outline in a flattened condition and has a truncated cone shape during inflation of the inflatable chamber.

5. The side airbag of claim 1 wherein the first open end and the second open end each have a cross sectional open area and wherein the cross sectional open area of the first end is less than 50% the cross sectional open area of the second end.

6. The side airbag of claim 5 wherein the cross sectional open area of the first open end is less than 25% of the cross sectional open area of the second open end.

7. The side airbag of claim 6 wherein the cross sectional open area of the first open end is less than 10% of the cross sectional open area of the second open end.

8. A combination comprising the side airbag of claim 1 and said inflator disposed at least in part within the inflatable chamber of the side airbag.

9. The combination of claim 8 configured for placement within a rear seat of the motor vehicle.

10. The side airbag of claim 1 wherein gas discharged through the first open end is discharged in a direction 180° from gas discharged from the second open end.

11. A rear side airbag for installation in a motor vehicle and configured to provide protection to an associated vehicle occupant, the rear side airbag comprising:
    an outer skin forming a single inflatable chamber having an upper thorax portion adapted for contact with a thorax region of the associated vehicle occupant and a lower pelvic portion adapted for contact with a pelvic region of the associated vehicle occupant, and
    a loop diffuser adapted for placement about an inflator disposed at least in part within the inflatable chamber, the loop diffuser having a truncated triangular outline in a flattened condition and a truncated cone shape during inflation of the inflatable chamber, the loop diffuser further having opposed first and second open ends, wherein the first open end is adapted to permit communication of inflation gas from the inflator to the upper thorax portion of the inflatable chamber and the second open end is adapted to permit communication of inflation gas from the inflator to the lower pelvic portion of the inflatable chamber, wherein the loop diffuser is adapted to permit significantly greater flow of inflation gas from the inflator to the lower pelvic portion of the inflatable chamber as compare to flow of inflation gas from the inflator to the upper thorax portion of the inflatable chamber.

12. The rear side airbag of claim 11 wherein the first open end and the second open end each have a cross sectional open area and wherein the cross sectional open area of the first end is less than 50% the cross sectional open area of the second end.

13. The rear side airbag of claim 12 wherein the cross sectional open area of the first open end is less than 25% of the cross sectional open area of the second open end.

14. The rear side airbag of claim 13 wherein the cross sectional open area of the first open end is less than 10% of the cross sectional open area of the second open end.

15. A combination comprising the rear side airbag of claim 11 and said inflator disposed at least in part within the inflatable chamber of the rear side airbag.

16. The combination of claim 15 configured for placement within a rear seat of the motor vehicle.

17. The rear side airbag of claim 11 wherein gas discharged through the first open end is discharged in a direction 180° from gas discharged from the second open end.

18. A rear side airbag assembly for installation in a motor vehicle and configured to provide protection to an associated vehicle occupant, the rear side airbag assembly comprising:
a rear side airbag having an outer skin forming a single inflatable chamber having an upper thorax portion adapted for contact with a thorax region of the associated vehicle occupant and a lower pelvic portion adapted for contact with a pelvic region of the associated vehicle occupant,
an inflator device disposed at least in part within the rear side airbag, the inflator device adapted, upon actuation, to supply a quantity of inflation gas to the rear side airbag to inflate the inflatable chamber, and
a loop diffuser disposed at least in part within the inflatable chamber about the inflator device, the loop diffuser having opposed first and second open ends, wherein the first open end is adapted to permit communication of inflation gas from the inflator device to the upper thorax portion of the inflatable chamber and the second open end is adapted to permit communication of inflation gas from the inflator device to the lower pelvic portion of the inflatable chamber, wherein the loop diffuser is adapted to permit significantly greater flow of inflation gas from the inflator device to the lower pelvic portion of the inflatable chamber as compare to flow of inflation gas from the inflator device to the upper thorax portion of the inflatable chamber.

19. The rear side airbag assembly of claim 18 wherein gas discharged through the first open end is discharged in a direction 180° from gas discharged from the second open end.

* * * * *